Jan. 13, 1931. R. E. BROWN 1,788,656
DISGORGING AND SCALING IMPLEMENT
Filed Aug. 12, 1929

Inventor
R. E. Brown
Lacey & Lacey, Attorneys

Patented Jan. 13, 1931

1,788,656

UNITED STATES PATENT OFFICE

ROBERT E. BROWN, OF OLEAN, NEW YORK

DISGORGING AND SCALING IMPLEMENT

Application filed August 12, 1929. Serial No. 385,330.

This invention relates to cutlery and more particularly to a disgorging and scaling implement for use by fishermen.

One object of the invention is to provide a disgorging and scaling implement resembling a pocket knife and including a handle and a blade pivotally carried thereby which may be swung from an open position in which it extends longitudinally from the handle for use to a folded position in which it is shielded by the handle after the manner of a penknife blade when closed and thereby allow the implement to be conveniently carried in a pocket.

Another object of the invention is to so form the blade that it may be easily thrust into a fish's mouth in order to disgorge a fishhook and to further form the blade along one edge with teeth which will allow scales to be easily removed preparatory to cooking a fish. Therefore, the implement may be used both as a disgorging implement and scaling knife.

Another object of the invention is to so locate the teeth upon the blade that when it is closed and the implement placed in a pocket the teeth will be shielded by the handle and prevented from tearing a pocket or cutting a person's hand when removing the implement for use.

The invention is illustrated in the accompanying drawing, wherein

Figure 1:
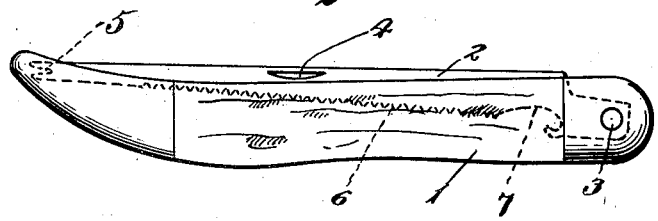
Figure 1 is a view in side elevation showing the blade closed.
Figure 2:
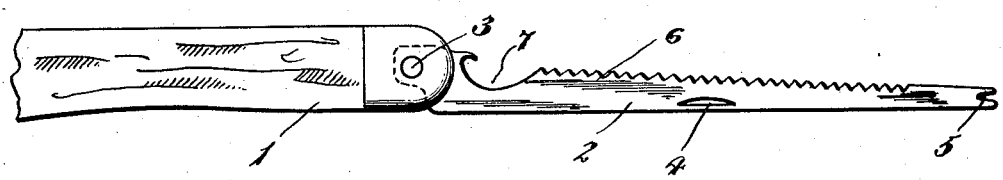
Fig. 2 is a similar view showing the blade opened for use.

The improved implement consists of a handle 1 and a blade 2 pivoted to the handle, as shown at 3, similar to the manner in which the blade of a penknife is mounted and preferably formed with a notch 4 for engagement by a finger nail so that the blade may be easily grasped and swung from the closed position shown in Fig. 1 to the opened position for use shown in Fig. 2. The blade when closed extends longitudinally of the handle with its free end and inner edge extending into the handle so that they are shielded. It will thus be seen that when the blade is closed the implement closely resembles a penknife. This blade is of sufficient length to extend well down the throat of a fish and terminates in a blunt free end notched, as shown at 5, so that a fishhook which has become caught deep within the throat of a fish may be engaged in the notch and pressure then exerted to release the hook and line. The blade has also been formed rather narrow, as shown in Fig. 2, so that it may be easily passed inwardly into the throat of a fish when disgorging a hook. The inner edge of the blade is serrated, as shown at 6, from its inner end to provide teeth which terminate in spaced relation to the outer or free end of the blade, thereby providing the blade with a toothed edge so that it can be used for removing scales from a fish preparatory to cooking the fish but leaving the side edges of the free end portions of the blade unobstructed and allowing the blade to be easily used for disgorging a hook and line.

When this scaling and disgorging implement is not in use, the blade is closed and extends longitudinally of the handle, as shown in Fig. 1, with its free end and serrated inner edge shielded similar to the manner in which the sharpened free end and cutting edge of a penknife blade is shielded by the handle when closed. Therefore, the implement may be placed in a pocket and there will be no danger of the pocket being torn or a person's hands cut when removing the implement for use. When the device is in use, the blade is swung to an open position in the same manner in which a penknife blade is opened and extends longitudinally from the handle, as shown in Fig. 2. When so opened, the implement is held by the handle and the blade can be thrust downwardly into a fish's throat in order to engage an embedded fishhook in the notch 5 and release it or it may be used as a scaling knife in the usual manner. When use of the implement is no longer necessary, the blade is closed and it can be again placed in a pocket. Between the teeth 6 and the heel, the blade is formed with a cap remover 7 by means of which caps crimped about bottle necks may be easily detached.

Having thus described the invention, I claim:

A disgorger and scaler comprising a handle open along one side, and a blade pivoted to said handle and movable from a closed position to an open position and when closed extending longitudinally of the handle and into the same through its open side, said blade being narrow and of slightly less length than the handle and having its front edge serrated to form scaling teeth, the said teeth terminating in spaced relation to the free end of the blade to provide the free end portion of the blade with smooth edges, the said blade terminating in a blunt free end notched to provide a longitudinally extending seat adapted to receive a fishhook during a disgorging operation.

In testimony whereof I affix my signature.

ROBERT E. BROWN. [L. S.]